P. KOLB.
INSECT DESTROYER.
APPLICATION FILED OCT. 5, 1916.

1,218,188. Patented Mar. 6, 1917.
4 SHEETS—SHEET 1.

Inventor
Peter Kolb.

By
Attorneys

P. KOLB.
INSECT DESTROYER.
APPLICATION FILED OCT. 5, 1916.
1,218,188.
Patented Mar. 6, 1917.
4 SHEETS—SHEET 2.
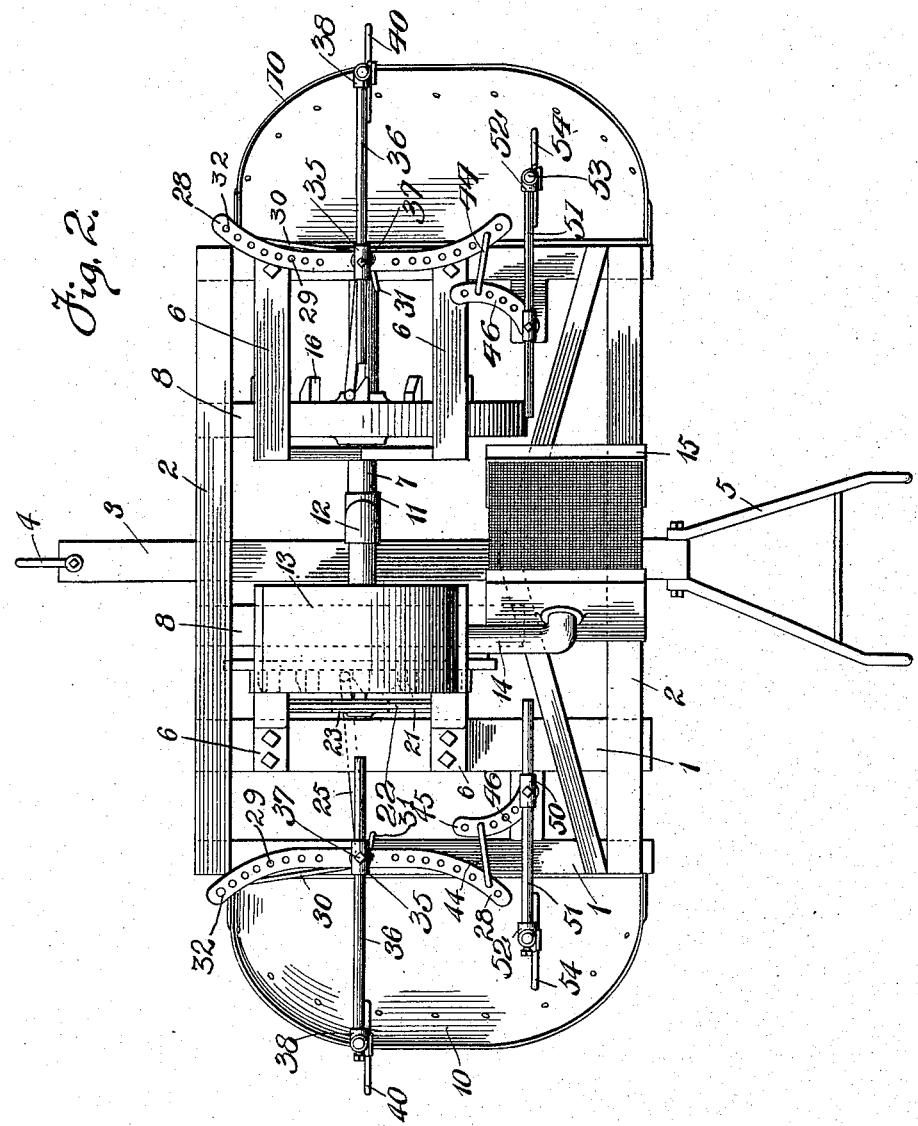
Inventor
Peter Kolb.
By
Attorneys

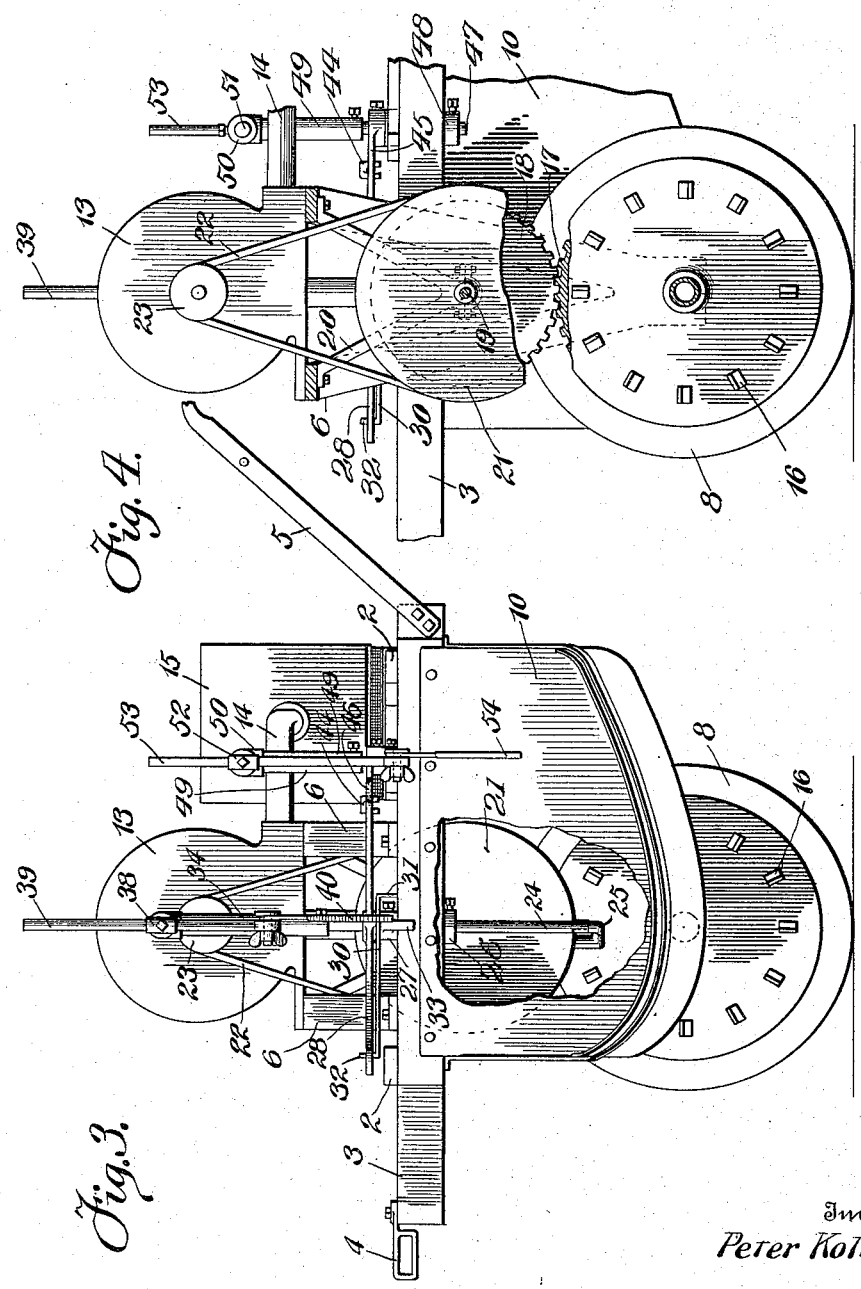

P. KOLB.
INSECT DESTROYER.
APPLICATION FILED OCT. 5, 1916.
1,218,188.
Patented Mar. 6, 1917.
4 SHEETS—SHEET 4.
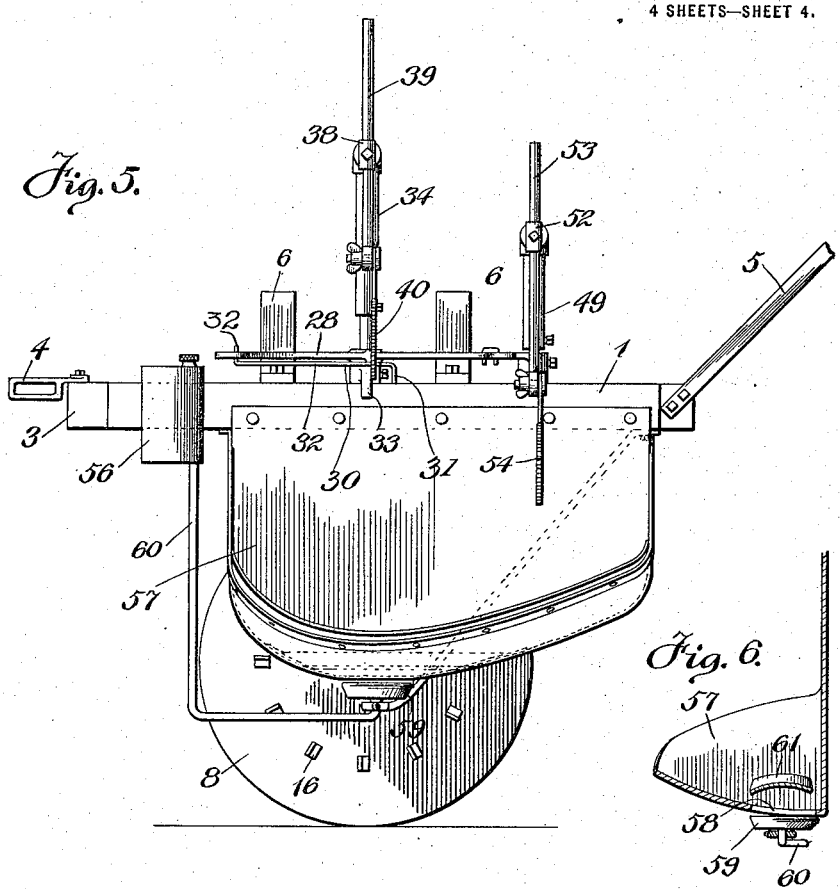
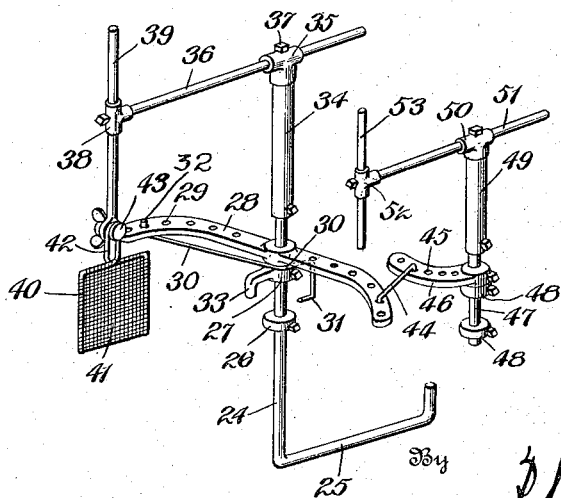
Inventor
Peter Kolb.
By
Attorneys.

UNITED STATES PATENT OFFICE.

PETER KOLB, OF FORT DEPOSIT, ALABAMA.

INSECT-DESTROYER.

1,218,188.        Specification of Letters Patent.        Patented Mar. 6, 1917.

Application filed October 5, 1916. Serial No. 123,970.

*To all whom it may concern:*

Be it known that I, PETER KOLB, a citizen of the United States, residing at Fort Deposit, in the county of Lowndes and State of Alabama, have invented certain new and useful Improvements in Insect-Destroyers, of which the following is a specification.

This invention relates to insect destroyers and has special reference to machines for removing boll weevils from growing cotton plants, although it is adapted for use in removing other insects from other plants.

One object of the present invention is to provide a machine which may be drawn over a field between rows of plants or adjacent a row of plants and which will automatically remove from the plants all insects which may be feeding thereon as well as withered or blighted blooms.

A further object of the invention is to provide a machine in which the insects will be effectually destroyed as they are removed and which may be adjusted to the size and position of the plants and will be so constructed as to avoid injury to the plants.

The invention is illustrated in the accompanying drawings and consists in certain novel features which will be hereinafter first fully described and then particularly pointed out in the claims following the description.

In the accompanying drawings:

Fig. 2 is a plan view of the machine;

Fig. 3 is a side elevation with parts broken away.

Fig. 4 is a detail view partly in elevation and partly in section on the line 4—4 of Fig. 1;

Fig. 5 is a detail side elevation showing a modification;

Fig. 6 is a detail transverse section of the hopper shown in Fig. 5;

Fig. 7 is a detail perspective view of a portion of the operating mechanism.

Figure 1:
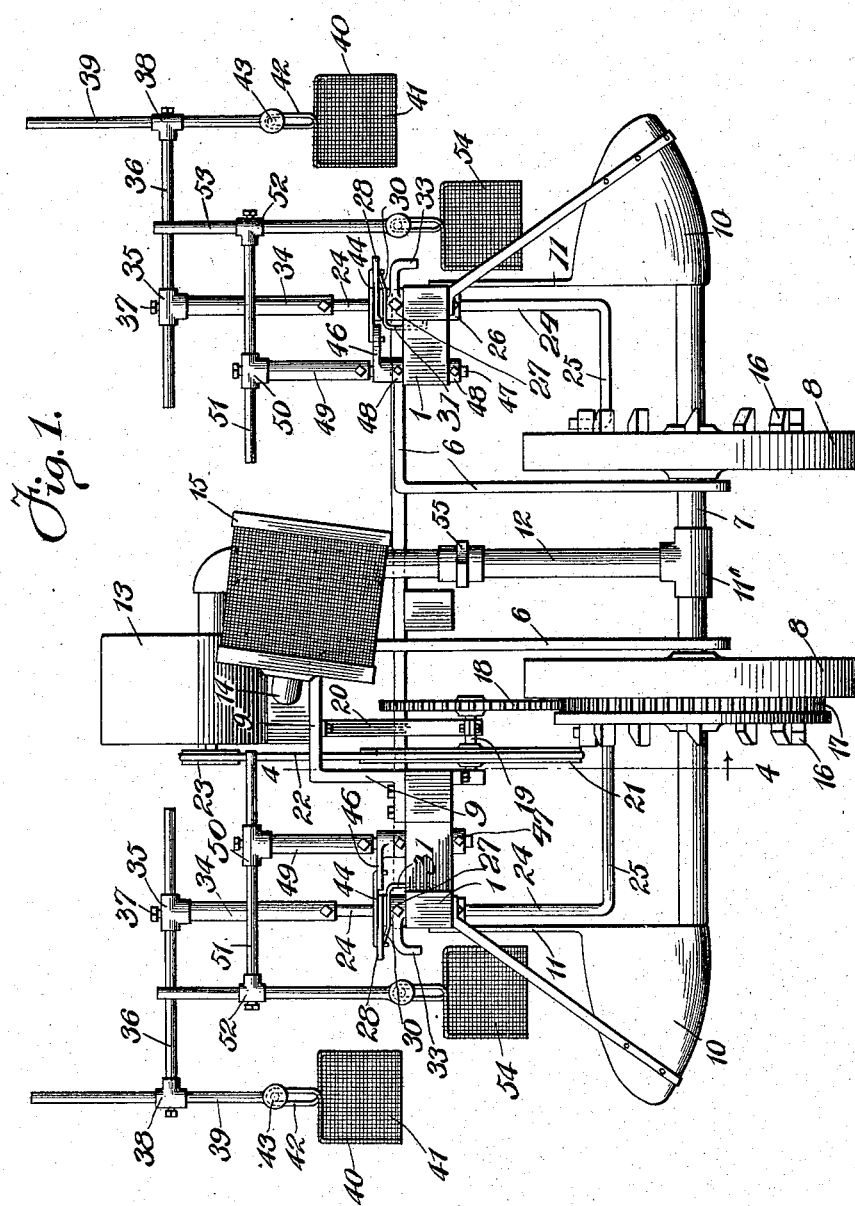
Figure 1 is a rear elevation of my improved machine, the rear cross beam being omitted.

The frame work of the machine may be of any convenient or preferred form and construction. In the present drawings it is illustrated as comprising longitudinal beams 1 and cross beams 2 connecting the said longitudinal beams, a draft beam 3 being secured to the cross beams at the center of the same, as shown most clearly in Fig. 2. A clevis 4 is provided at the front end of the beam 3 and steering handles 5 are provided at the rear end of the same. Brackets 6 are secured upon the frame and have depending portions in the lower ends of which is secured a transverse pipe or tube 7 which is of substantial construction and has ground wheels 8 rotatably mounted thereon. The brackets 6 are secured upon the top of the main frame and the brackets at one side of the draft beam are so formed as to extend vertically above the main frame, as shown at 9, so as to provide clearance for a part of the operating gearing as will be presently more particularly set forth. The outer ends of the tube or pipe 7 are fitted in hoppers 10 which are supported by hangers 11 depending from the main frame, as shown. These hangers may be of any preferred form but in the present instance are shown as consisting of a plate of metal coextensive with the longitudinal dimension of the hopper and secured at its upper edge to the side bar of the main frame. This construction utilizes the hanger also as a shield to prevent the insects being forced past the hopper and cause them to drop into the same. At its center the tube 7 is fitted with a T-coupling 11' from which rises a vertical pipe 12 having its upper end entering a fan casing 13. This fan casing is supported by the brackets 6 and from the rear sides of the same an outlet pipe 14 extends to a cage 15 having perforate sides so that the air forced into the same by the fan may escape but the insects and shrunken blooms carried by the air blast will be arrested and held in the cage.

The ground wheels 8 are both provided on their outer faces with lugs 16, the purpose of which will presently appear, and one of the wheels (that appearing at the left in the present instance) is also provided with gear teeth 17. These teeth 17 mesh with a gear wheel 18 on the end of a countershaft 19 which is supported by the yoke or hanger 20, depending from the upper end of the bracket 6, and by a suitable bearing on the main frame. A pulley 21 is also secured upon the shaft 19 and a belt 22, trained around said pulley, is also trained around a smaller pulley 23 on the fan shaft so that the fan will be driven from the ground wheel. It will be readily understood that the action of the fan is to create a strong suction through the tubes 7 and 12 so that any and all insects which may be deposited in the hopper 10 will be drawn therefrom through the said tubes into the fan casing and thence expelled through the pipe 14 into the cage 15.

Journaled in the side bars of the main frame are vertical pivot arms 24 of levers 25 which have their inner ends disposed in the path of the lugs 16 so that as the ground wheels rotate the lugs will successively impinge upon the ends of the levers and vibrate the same. Each lever is equipped with a stop collar 26 adapted to bear against the under side of the side bar of the main frame and thereby prevent upward movement of the lever, and a stop collar 27 which rests upon the side bar of the main frame and thereby prevents downward movement of the lever. Secured to the pivot arm of the lever, immediately above the upper stop collar 27, is a tension arm or bar 28 which is provided with a longitudinal series of openings 29. A spring 30 is disposed adjacent the said pivot arm and has one end 31 secured to the main frame and its opposite end 32 engaged in one of the openings 29. When the lever 25 is moved by one of the lugs 16, the impulse is against the influence of the spring 30 which is thereby put under tension so that as soon as the free end of the lever clears the lug 16, the spring will return the lever to its initial position. The upper stop collar 27 is provided with a lateral finger 33 having a downturned extremity which is adapted to impinge against the side of the main frame and thereby limit the movement of the lever and of the tension bar in either direction. The pivot arm 24 of the lever is extended above the tension bar and upon the upper portion of said arm is adjustably secured a sleeve 34. The upper end of this sleeve is fitted with a T-coupling 35 through which is inserted a rod or bar 36 which may be adjusted longitudinally through the coupling 35 and held in any set position by a set screw 37 mounted in said coupling. This rod or bar 36 extends laterally from the side of the machine and at its outer end carries a T-coupling 38 in which is adjustably secured a rod 39. To the lower end of the said rod and against the side of the same is secured a beater 40 which consists of a wire or other frame having a piece of cloth, gauze, wire netting or other material 41 secured between its sides and having a longitudinally slotted stem 42 through which a thumb bolt 43 is inserted into the rod 39 so as to secure the beater in any desired position. It will be understood that the beater may be adjusted longitudinally of the slotted stem 42 or may be adjusted about the bolt 43 as a pivot so that the beater may be set in any position which may be most advantageous under any given circumstances. The adjustability of the rods 36 and 39 permit the beater to be brought into such position as may be indicated by the height or width of the plants or the distance from the plants which must be taken by the machine under any conditions.

It will be noted, upon reference to Figs. 2 and 7 more particularly, that the tension bar or arm 28 extends in both directions from the pivot arm 24. To that end of the tension bar or arm remote from the extremity 32 of the spring 30, I pivotally attach one end of a link 44 which has its opposite end pivotally fitted in any one of the openings 45 in an arm 46 which is secured to and projects radially from a rock shaft 47 which is journaled vertically in the main frame and is equipped with the stop collars 48 above and below the main frame to prevent vertical movement thereof. Upon the upper end of the shaft 47 is adjustably fitted the sleeve 49 having a T-coupling 50 on its upper end. A rod or bar 51 is adjustably secured in said coupling and is equipped with a T-coupling 52 at its outer end in which is adjustably secured the rod or bar 53 carrying a beater 54 at its lower end. The beater 54 is constructed in all respects in the same manner as the beater 40 and is mounted upon the rod 53 in the same manner that the beater 40 is mounted upon the rod 49.

The machine may be drawn over the field by draft animals or by a tractor or may be pushed manually. As it proceeds along the row, the fan will be set in motion so that a strong suction will be created through the tubes communicating therewith and insects and shrunken or otherwise defective blooms deposited in the hopper will be caused to travel to and into the cage 15. The forward travel of the machine will also effect oscillation of the levers 25 so that the arms 36 and 51 will be likewise oscillated and the beaters caused to strike forcibly against the plants and drive therefrom all insects and defective blooms. It will be noted particularly upon reference to Fig. 2, that the beaters are directed over the hoppers and, consequently, the insects and other matter will be deposited in the hoppers by the action of the beaters.

The cage 15 may be secured in any desired manner to the discharge tube 14 so that it may be readily removed when it is full or it is desired to destroy the contents thereof. It may sometimes be found desirable to place a screen within the tube 12, immediately adjacent the fan casing, so that none of the matter sucked in through the tubes will be permitted to enter the fan casing and wrap about the fan. In this event, the cage 15 would be dispensed with and a vacuum chamber connected with the tube 12 adjacent its entrance into the fan casing. It will also be noted that the tube 12 is provided with a coupling 55 so that access may be easily had to its interior to relieve choking should it become necessary.

In Figs. 5 and 6 I illustrate an arrangement by the use of which the fan and the parts coöperating therewith and operating the same may be dispensed with. In this alternative or modified arrangement, a tank 56 is secured upon the frame adjacent the hopper and the gasolene or similar material is stored in the tank. The hopper 57 is provided with an opening 58 in its bottom and a burner 59 is disposed immediately below the said opening, said burner being in communication with the tank 56 through a pipe 60. To prevent the plants being injured by the flame from the burner 59 and at the same time permit the insects and other matter to reach the flame, I provide a longitudinal partition 61 within the hopper which extends over the opening 58 in spaced relation to the bottom of the hopper, as clearly shown in Fig. 6. This arrangement permits the insects and defective blooms to pass to the opening 58 where they will be consumed by the flame from the burner 59 but, at the same time, prevents the flame rising through the hopper so as to scorch or otherwise injure the plants.

It will be readily noted from the foregoing description, taken in connection with the accompanying drawings, that I have provided a very simple machine by the use of which insects and defective blooms will be beaten from plants and delivered into the hoppers automatically and either destroyed at once or stored for subsequent disposal. The machine will preferably be built so as to operate upon two rows of plants simultaneously, but by removing the cross bars 2 and shifting the draft beam 3 so that it will be secured to the bracket 6, either side may be used alone and this arrangement will provide a very efficient hand machine. The beaters are driven positively from the ground wheels and the link 44 may be adjusted in both the tension bar 28 and in the radial arm 45 so that any desired movement of the beater 54 relative to the beater 40 may be obtained. By engaging the end of the spring 30 in any one of the openings 29, the tension of the spring may be readily regulated.

Having thus described the invention, what is claimed as new is:

1. In a machine for the purpose set forth, the combination of a main frame, a lever having a vertical pivot arm journaled in the frame, a bar connected with the upper end of the pivot arm of the lever, a spring having one end secured to the frame and its opposite end engaging said bar, a beater connected with the lever, and means for actuating said lever in opposition to said spring.

2. In a machine for the purpose set forth, the combination of a main frame, a lever having a vertical pivot arm journaled in the frame, stop collars on said arm above and below the frame, the upper stop collar being constructed with a finger adapted to impinge against the frame, a beater connected with said lever, and means for oscillating the lever.

3. In a machine for the purpose set forth, the combination with a main frame, of a lever having a pivot arm vertically mounted in the frame, a rock shaft mounted vertically in the frame adjacent the pivot arm of the lever, beaters carried by said rock shaft and said pivot arm, means for vibrating the lever, and connections between the lever and the rock shaft whereby to effect simultaneous operation of the beaters.

4. In a machine for the purpose set forth, the combination of a vertically disposed rocking arm, means for rocking said arm, a sleeve adjustably secured on the upper end of the arm, a rod secured upon the upper end of the sleeve and adjustable across the same, a second rod connected with one end of the first-mentioned rod and adjustable angularly with respect thereto, and a beater carried by the lower end of the last mentioned rod.

5. In a machine for the purpose set forth, the combination of a lever having a vertical arm pivoted within the main frame, a bar secured upon the upper end of said vertical arm, means acting on the lever and said bar to vibrate the lever, a rock shaft journaled vertically in the main frame, an arm extending from said rock shaft, a link connecting said arm with said bar, and beaters carried by the rock shaft and by the lever.

6. In a machine for the purpose set forth, the combination of a vertically disposed member mounted to oscillate in a horizontal plane, means for actuating said member, a beater support carried by said member, and a beater secured to said support and adjustable longitudinally and pivotally thereon in its own plane.

7. In a machine for the purpose set forth, the combination of a vertically disposed oscillatory member, means for actuating said member, a beater support carried by said member and including a vertically disposed rod, a beater arranged at the lower end of said rod and having a longitudinally slotted stem, and a securing member inserted through said slotted stem into said rod whereby the beater may be adjusted longitudinally and pivotally in its own plane.

In testimony whereof I affix my signature.

PETER KOLB. [L. S.]